(12) United States Patent
Bhakta (10) Patent No.: US 9,554,101 B2
(45) Date of Patent: Jan. 24, 2017

(54) SHARED-PATH ILLUMINATION AND EXCITATION OPTICS APPARATUS AND SYSTEMS

(71) Applicant: TEXAS INSTRUMENTS INCORPORATED, Dallas, TX (US)

(72) Inventor: Vikrant R. Bhakta, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 74 days.

(21) Appl. No.: 14/583,764

(22) Filed: Dec. 28, 2014

(65) Prior Publication Data

US 2016/0191869 A1 Jun. 30, 2016

(51) Int. Cl.
*H04N 9/31* (2006.01)
*F21V 8/00* (2006.01)
*G02B 27/09* (2006.01)
*G02B 26/00* (2006.01)
*G03B 21/20* (2006.01)
*G02B 27/42* (2006.01)

(52) U.S. Cl.
CPC ........... *H04N 9/3111* (2013.01); *G02B 6/0096* (2013.01); *G02B 26/008* (2013.01); *G02B 27/0927* (2013.01); *G02B 27/0994* (2013.01); *G02B 27/4244* (2013.01); *G03B 21/208* (2013.01)

(58) Field of Classification Search
CPC ... G03B 21/142; G03B 21/204; G03B 21/208; G02B 6/32; G02B 6/0003; G02B 6/0008; G02B 2207/113
See application file for complete search history.

(56) References Cited

U.S. PATENT DOCUMENTS

| | | | |
|---|---|---|---|
| 2010/0054284 A1* | 3/2010 | Dekker | H01S 3/1086 372/3 |
| 2010/0080016 A1* | 4/2010 | Fukui | A61B 1/0653 362/574 |
| 2011/0176290 A1* | 7/2011 | Nishio | G02B 6/262 362/84 |
| 2012/0300178 A1* | 11/2012 | Sugiyama | H04N 9/3111 353/31 |
| 2013/0182452 A1* | 7/2013 | Takahira | F21V 9/00 362/510 |
| 2014/0043589 A1* | 2/2014 | Chifu | G03B 21/204 353/33 |
| 2014/0226301 A1 | 8/2014 | Khan | |

* cited by examiner

*Primary Examiner* — Sultan Chowdhury
(74) *Attorney, Agent, or Firm* — Michael A. Davis, Jr.; Charles A. Brill; Frank D. Cimino (57) ABSTRACT

A Gaussian-distributed excitation light beam of an excitation spectrum emitted from an excitation light source enters a light pipe and is there converted to a top-hat spatially distributed excitation beam. The top-hat distributed excitation beam is focused on a phosphor-coated or reflective portion of a surface of an optical wavelength conversion element. Fluoresced and reflected beams travel outward from the wavelength conversion element and re-enter the light pipe to be homogenized during transit through the light pipe. A homogenized fluoresced or reflected beam is relayed to an output as one of a sequence of colors of homogenized light. The functions of Gaussian to top-hat conversion of the excitation beams directed toward the optical conversion element and homogenization of beams directed outward from the optical conversion element are both efficiently performed using a single, shared light pipe.

19 Claims, 8 Drawing Sheets

SHARED-PATH ILLUMINATION AND EXCITATION OPTICS APPARATUS AND SYSTEMS

TECHNICAL FIELD

Embodiments described herein relate to apparatus and systems associated with solid state illumination, including illumination associated with image projection.

BACKGROUND INFORMATION

For modern systems of illumination, whether illumination associated with ambient lighting, image capture, image projection, image viewing, signage illumination and/or projection, etc. it is often desirable to generate one or more specific narrow spectra of light. In particular, it is often desirable to generate narrow spectrum light corresponding to one or more of the additive primary-color components red ("R"), green ("G") and blue ("B") and/or spectra corresponding to one or more of the subtractive color components magenta ("M"), cyan ("C") and yellow ("Y"). A full set of such primary color narrow spectra may be color-balanced to create white light. White light may in turn be filtered to create any other color.

Another example use of a set of primary colors of light is the time-sequencing of each primary color onto a digital micro-mirror device ("DMD") associated with a Texas Instruments Incorporated Digital Light Processing ("DLP")™ projection system. Each micro-mirror of a two-dimensional matrix of micro-mirrors on the DMD surface may be separately re-positioned at the start of each primary color time slot to reflect a single pixel of the current primary color into or away from an optical projection system. Doing so produces a projected two-tone pixel image of the current primary color. A series of such two-tone pixel images projected while rapidly sequencing between primary colors is integrated by the human eye to create the illusion of full-color image frames seen as a still or moving picture.

Many systems of illumination require significant light power expressed in lumens. In turn, energy efficiency standards often dictate minimum light generation efficiency expressed in lumens of output light power per watt of electrical input power. A laser is a potentially powerful and efficient light source due to its low etendue and narrow spectral band. In particular, blue light emitted at approximately 448 nm and ultraviolet ("UV") light emitted at approximately 405-420 nm are energetic and can be generated by lasers at high efficiencies. To take advantage of this phenomenon and to engineer simpler multi-wavelength illumination systems, light from one or more blue or UV lasers may be used to excite one or more luminescent phosphors coating one or more portions of a surface of a wavelength conversion element such as a phosphor wheel. Various phosphors are available, each capable of luminescing in a narrow spectrum when excited by a particular excitation spectrum of light. This technique may be used to create multiple primary colors from a low etendue, narrow band excitation light source.

Figure 1:
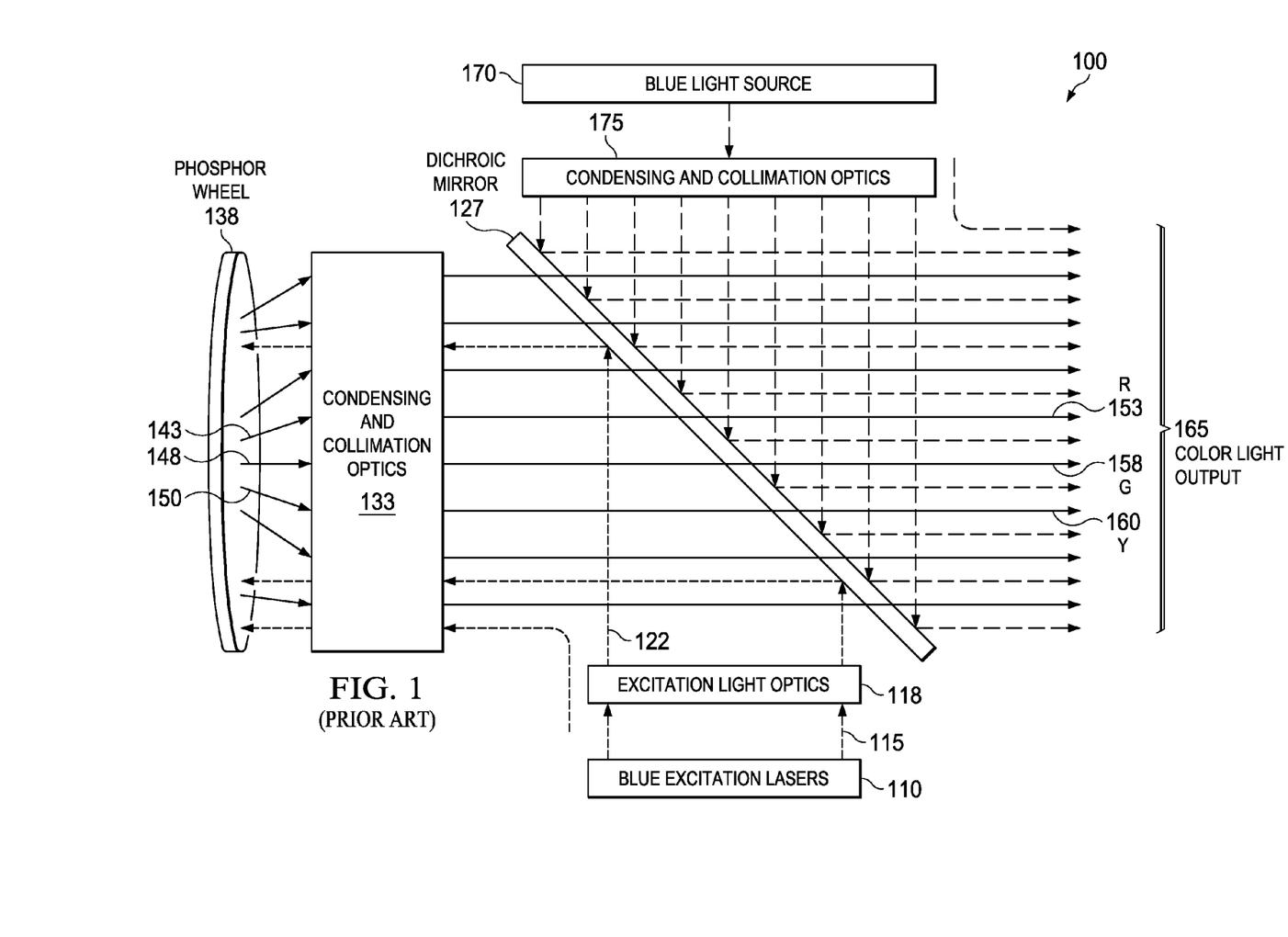
FIG. 1 is a prior-art schematic diagram of a multi-wavelength light generation apparatus using a low etendue, narrow band excitation light source.

FIG. 1 is a prior-art schematic diagram of a multi-wavelength light generation apparatus 100 using a low etendue, narrow band excitation light source 110. The excitation light source 110 is an emitter of high-energy light 115 (e.g., a blue laser). The emitted light 115 is processed by one or more condensing, collimation, diffusion and/or beam shaping excitation optical element group(s) 118 to generate an excitation beam 122. The element group 118 may include a beam-shaping element such as an optical diffuser, for example. The beam-shaping element homogenizes the excitation beam 115 from the excitation light source 110 in order to better distribute the intensity of the excitation beam 115 over the beam area at the phosphor wheel 138. The excitation beam 122 is reflected by a dichroic mirror 127 through condensing and collimation optics group 133 and onto a surface of a phosphor wheel 138. Each of various phosphors coated onto various areas of the surface of the phosphor wheel 138 luminesces at a predetermined wavelength as it is illuminated by the excitation beam 122.

It is noted that the various phosphor-coated areas may be exposed to the excitation beam 122 at different times by locating the areas radially around the wheel surface and rotating the wheel. Doing so may desirably temporally separate the output colors. Each resulting wavelength of light emanating from the phosphor wheel 138 (e.g., as represented by light rays 143, 148, and 150) corresponds to a desired output color (e.g., R 153, G 158 and Y 160). The phosphor-emitted wavelengths are collected and collimated by the optics group 133 and are passed to the output 165 through the dichroic mirror 127.

If the excitation light source 110 emits light of a visible wavelength such as blue as illustrated in the example apparatus 100, it may be desirable to include the excitation light color in the color sequence at the output 165. However, doing so is not easily accomplished by simply reflecting light of the excitation spectrum from the phosphor wheel surface, because the dichroic mirror is designed to reflect and not pass light of the excitation spectrum. Consequently, such a dichroic mirror-based system may include a separate light source 170 to emit light of a color corresponding to the excitation spectrum for sequencing at the output 165. The latter configuration may also include one or more condensing, collimation, diffusion and/or beam shaping optical element group(s) 175. Such additional components add cost and complexity.

Figure 2:
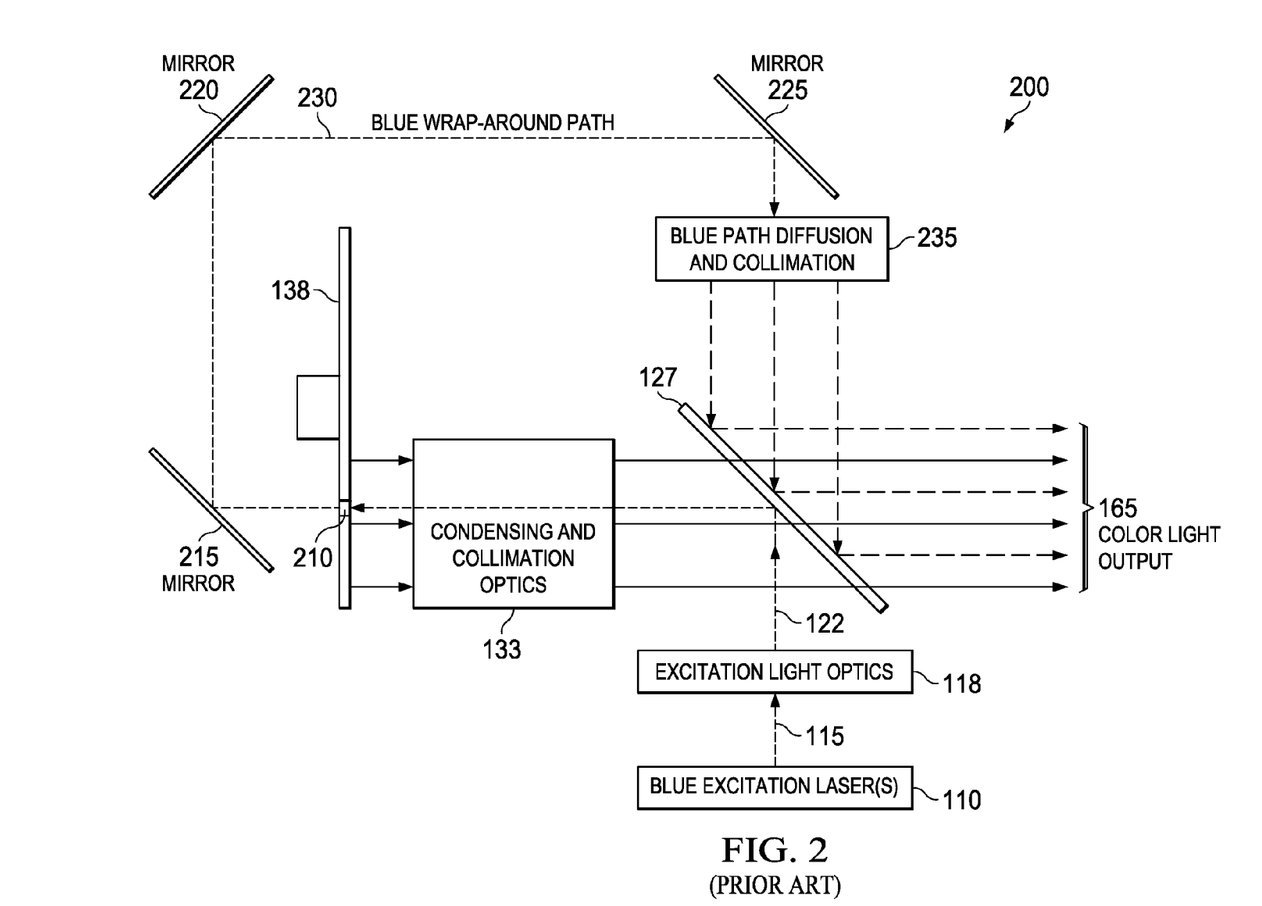
FIG. 2 is a prior-art schematic diagram of a multi-wavelength light generation apparatus using a low etendue, narrow band excitation light source.

FIG. 2 is a prior-art schematic diagram of a multi-wavelength light generation apparatus 200 using a low etendue, narrow band excitation light source. The apparatus 200 includes one or more blue light excitation lasers 110, light 115, excitation light optical element group 118, excitation beam 122, dichroic mirror 127, condensing and collimation optics group 133, phosphor wheel 138 and output 165, all as described above with reference to FIG. 1. Additionally, the apparatus 200 includes an opening 210 in the phosphor wheel (e.g., a slot along a radius) to pass light of the excitation spectrum (e.g., blue) at a time when the color corresponding to the excitation spectrum is desired. A series of mirrors (e.g., the mirrors 215, 220 and 225) create a "wrap-around" path 230 to direct light in the excitation spectrum to a diffusion and collimation optical group 235. Collimated light in the excitation spectrum is subsequently reflected by the dichroic mirror 127 to the output 165. The wrap-around path 230 may increase the overall size of the apparatus 200.

As noted, the prior-art apparatus 100 and 200 may both include a duplication of optical elements such as diffusers and/or beam-shaping elements. One set of duplicate elements is included in the excitation light optics group 118 to process the excitation light 115. The other set of duplicate optical elements is included in the element group 175 of the apparatus 100 and the element group 235 of the apparatus 200 to process blue light to be sequenced at the output 165. The duplicate optical elements add cost and complexity.

SUMMARY OF THE INVENTION

Structures herein generate sequenced beams of colored light emitted and/or reflected from an emitting surface of an optical wavelength conversion element such as a phosphor-coated wheel. One or more excitation energy sources emit high-energy, narrow wavelength beams of light ("excitation beams"). The term "beam" as used herein means a beam of light. Each excitation source emits light in a narrow spectrum referred to herein as the "excitation spectrum." Examples of such excitation light sources include a blue or UV laser, a blue LED, or an array of lasers and LEDs. Some excitation sources may include beam focusing elements. The excitation beams have a substantially Gaussian spatial and spectral distribution. Each excitation beam travels to a light pipe and is converted by the light pipe from a Gaussian spatial distribution to a top-hat spatial distribution. The Gaussian to top-hat conversion more evenly distributes power of the excitation beam across the area of the excitation beam at the emitting surface of the wavelength conversion element. The top-hat distributed excitation beams are focused and/or directed onto one or more areas of the emitting surface of the wavelength conversion element.

Some area(s) of the emitting surface are coated with one or more types of phosphor, each designed to fluoresce in a particular narrow band spectrum of light ("fluoresced spectrum") when excited by the excitation beam to produce a fluoresced output beam. The phosphor coated surfaces of the optical wavelength conversion element thus effectively convert light energy of the excitation spectrum to light energy of the fluoresced spectrum.

Some embodiments include areas of the emitting surface reflective to light of wavelengths in the excitation spectrum. The reflective areas serve the purpose of including the color of light associated with the excitation spectrum in the sequence of output beams. The reflective areas may be coated or etched with a dispersive surface to scatter and thus better distribute the energy content of the reflected excitation beam. The return beam fluoresced or reflected by the emitting surface of the optical wavelength conversion element is focused into and homogenized by the light pipe. The excitation beam traveling to the wavelength conversion element and the fluoresced or reflected beam traveling back from the wavelength conversion element are respectively top-hat converted and homogenized by the same light pipe.

For purposes herein, the term "emitting surface" shall mean an entire surface of the optical wavelength conversion element including phosphor-coated and reflective areas. One entire side of a phosphor-coated wheel, for example, is referred to herein as the "emitting surface." A particular area of the emitting surface may be phosphor coated, reflective, or neither. The term "emitting axis" as used herein refers to an axis perpendicular to the emitting surface and passing through a point of emission of a fluoresced beam or a point of reflection of a reflected excitation beam.

Some embodiments herein may include switchable Bragg filters to filter unconverted portions of light in the excitation spectrum from the fluoresced output beam. Systems described herein synchronize and sequence different colors of output light with the operation of a DMD to generate a multi-colored or full-color pixel image.

DETAILED DESCRIPTION

Figure 3:
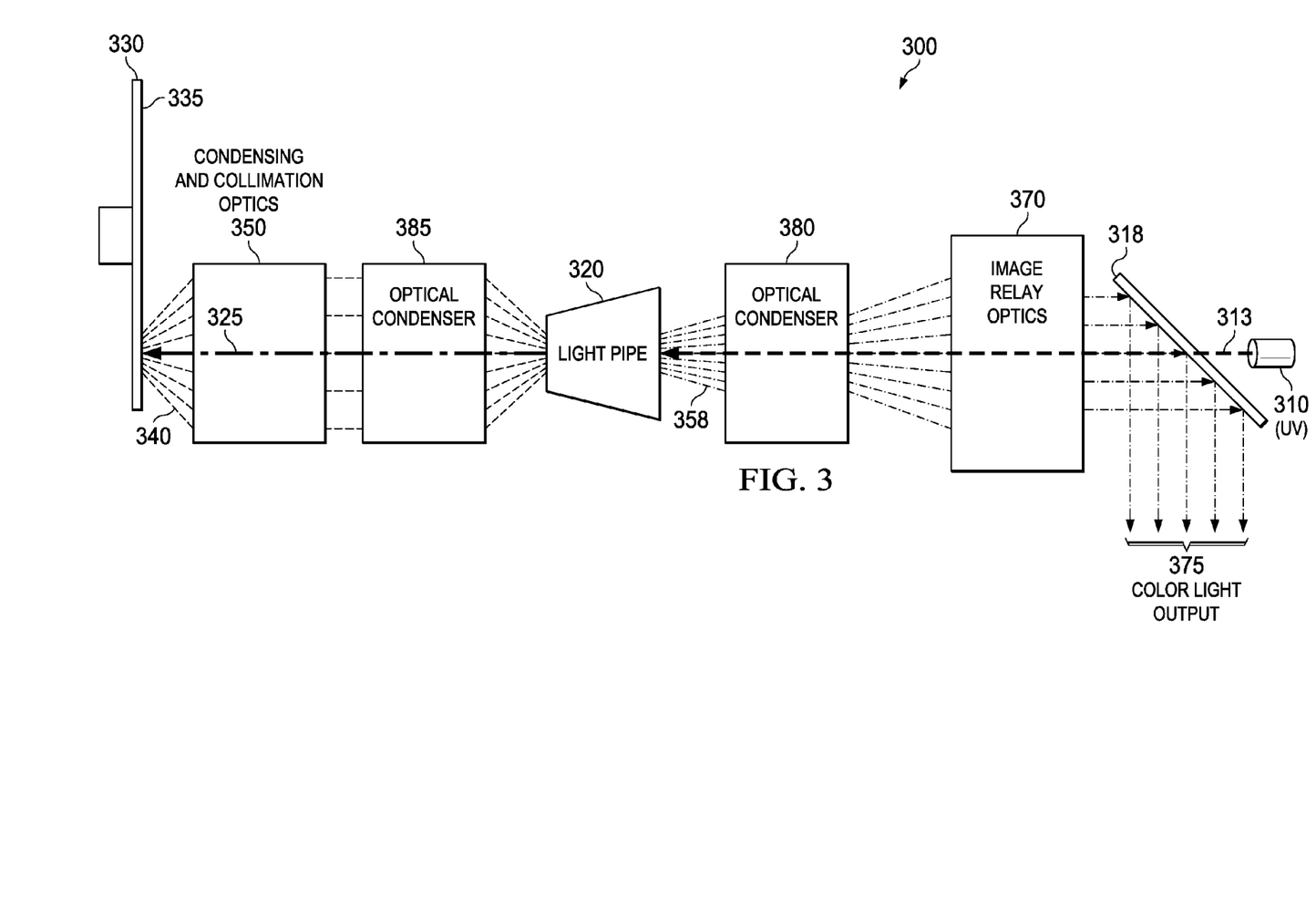
FIG. 3 is a schematic diagram of a shared-path illumination apparatus according to various example embodiments of the invention.

FIG. 3 is a schematic diagram of a shared-path illumination apparatus 300 according to various example embodiments of the invention. The apparatus 300 includes one or more electromagnetic excitation energy sources 310 such as a laser or array of lasers. Each excitation energy source 310 emits an excitation beam 313 of high-energy, narrow band light (e.g., UV light). The excitation beam 313 has a Gaussian spatial power distribution, as further described below, and includes wavelengths in a narrow excitation spectrum.

The apparatus 300 also includes a light pipe 320 optically coupled to the excitation energy source 310 to receive the Gaussian excitation beam 313. The light pipe 320 re-distributes power across an area of the Gaussian excitation beam 313 corresponding to the width of the excitation beam 313. Power is re-distributed in such a way as to convert the Gaussian spatial distribution of the excitation beam 313 to form a substantially top-hat spatially distributed excitation beam 325. Peak power of the Gaussian excitation beam 313 is re-distributed in order to avoid thermal quenching during excitation of phosphors at higher illumination powers.

Figure 4A:
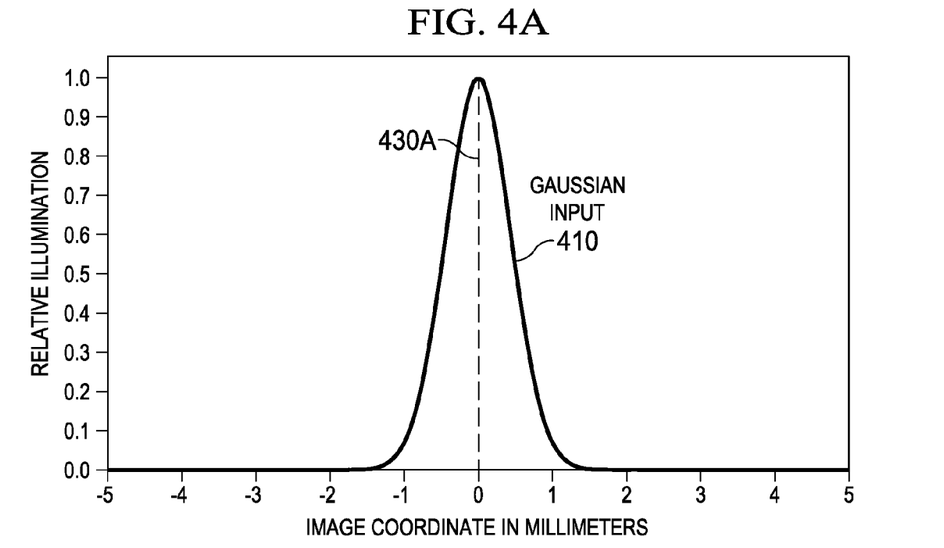
FIG. 4A is an illumination plot illustrating a Gaussian spatial distribution of an excitation beam associated with illumination apparatus according to various example embodiments.
Figure 4B:
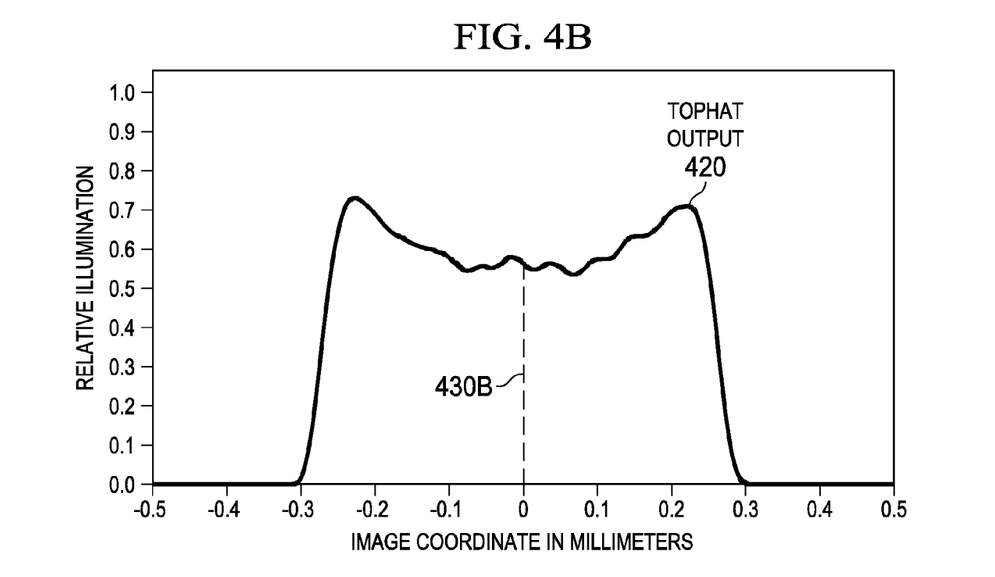
FIG. 4B is an illumination plot illustrating a top-hat spatial distribution of light from a top-hat converted excitation beam associated with illumination apparatus according to various example embodiments.

FIGS. 4A and 4B are an illumination plots illustrating a Gaussian spatial distribution 410 and a top-hat spatial distribution 420, respectively. The Gaussian and top-hat spatial distribution plots 410 and 420 are associated with the illumination apparatus 300 according to various example embodiments. The plots 410 and 420 show relative illumination on the vertical axis as a function of distance from the centers 430A and 430B of the Gaussian excitation beam 313 and the top-hat distributed excitation beam 325, respectively. For purposes herein, relative illumination is defined as irradiance at a point along a radial line of a beam cross section normalized to peak irradiance within the beam cross section. The point of peak irradiance may or may not be at the beam center. The excitation beam 313 may be characterized as having a substantially Gaussian spatial distribution across the beam width and having a substantially Gaussian spectral distribution across a narrow excitation spectrum. References herein to a "Gaussian excitation beam" refer to the spatial Gaussian distribution characteristic of the excitation beam 313.

Turning back to FIG. 3, some embodiments of the apparatus 300 also include a dichroic mirror 318 optically coupled to the light pipe 320. The dichroic mirror 318 is designed to transmit UV wavelengths and to reflect non-UV wavelengths. The dichroic 318 passes the Gaussian excitation beam 313 and reflects homogenized fluoresced beams 358 returned from the light pipe 320 to an output 375.

It is noted that the apparatus 300 is an example case of the excitation beam 313 entering the excitation light path via image relay optics used to relay output light beams to the output 375. Example cases of the excitation beam 313 entering the excitation light path directly without passing through portions of image relay optics are described below.

The shared-path illumination apparatus 300 also includes an optical wavelength conversion element 330 optically coupled to the light pipe 320 and on to the excitation energy source 310. One or more portions of an emitting surface 335 of the wavelength conversion element 330 are coated with a fluorescent phosphor to receive the top-hat distributed excitation beam 325 from the light pipe 320. The conversion element 330 generates one or more fluoresced beams of photons 340 of one or more fluoresced spectra. Each beam 340 of a particular fluoresced spectrum corresponds to the type of phosphor being illuminated by the top-hat distributed excitation beam 325 at a particular time. Each beam 340 is generated with a predetermined periodicity during one or more predetermined periods of time.

Some embodiments of the optical wavelength conversion element 330 may also include one or more reflective surfaces. The reflective surfaces reflect the top-hat spatially distributed excitation beam 325 with a predetermined periodicity during one or more predetermined periods of time. The light pipe 320 homogenizes the fluoresced beam 340 or the reflected top-hat distributed excitation beam to form a homogenized fluoresced or reflected beam 358.

The wavelength conversion element 330 may of any shape and may be capable of rotation or may be designed to be stationary. In some embodiments, the wavelength conversion element 330 may be a wheel capable of spinning as further described below. Two or more portions of the surface 335 may be coated with different phosphors, each designed to fluoresce in a particular narrow spectrum. For example, the phosphors may be designed to fluoresce in spectra corresponding to two or more of the primary colors red, green blue, cyan, magenta, and/or yellow. Doing so and combining the fluoresced colors with a color corresponding to an excitation spectrum may produce white light when integrated by the human eye. Control of the intensity of each primary color on a pixel by pixel basis may enable full-color image projection as further described below.

Figures 5, 6:
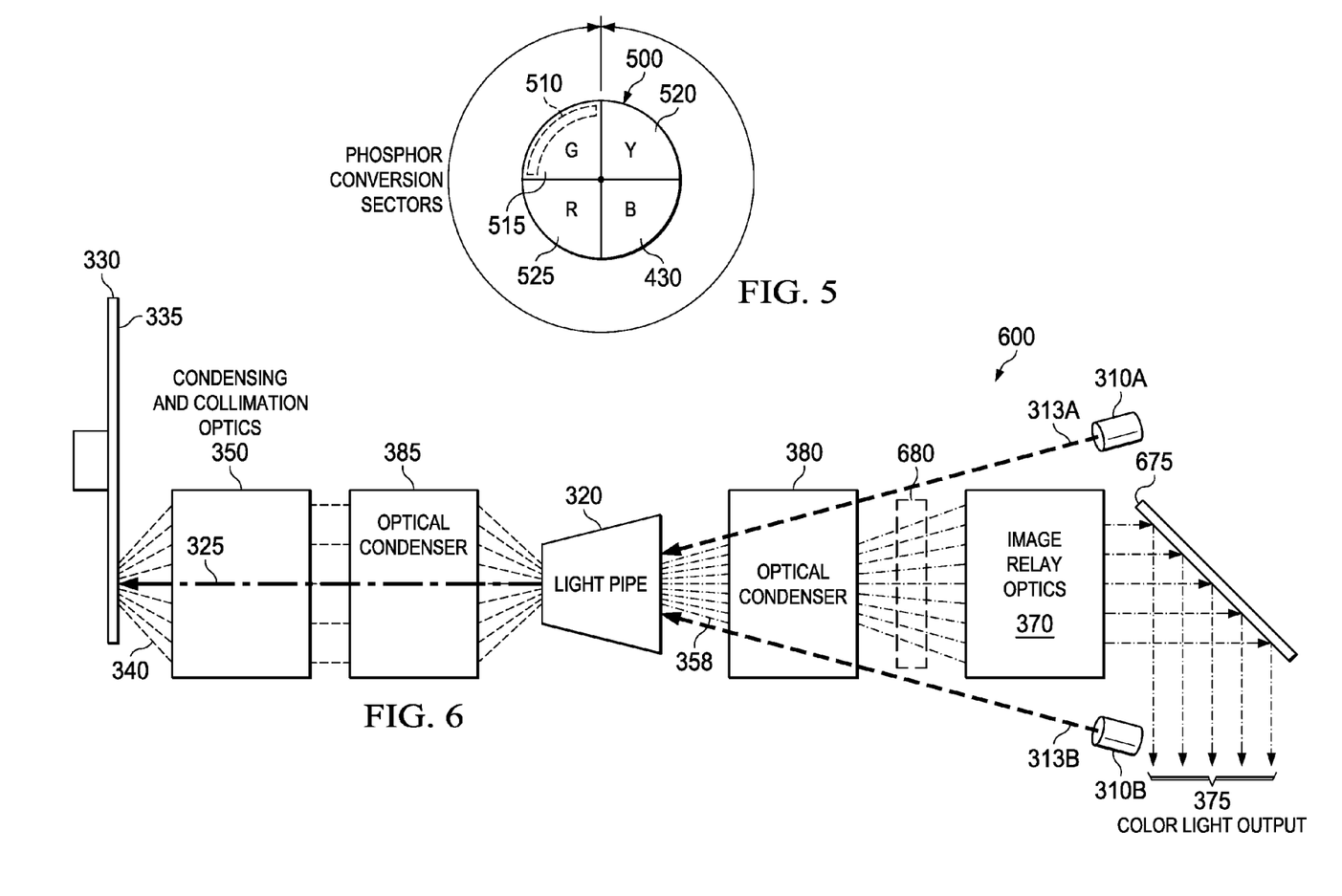
FIG. 5 is diagram of a phosphor coated wheel surface according to various example embodiments.
FIG. 6 is a schematic diagram of a shared-path illumination apparatus according to various example embodiments.

FIG. 5 is diagram of a phosphor coated wheel surface 500 according to various example embodiments. FIG. 5 illustrates the wavelength conversion element 330 embodied as a phosphor coated wheel and the emitting surface 335 embodied as the wheel surface 500. One or more portions (e.g., the portion 510) of one or more radial sectors (e.g., the radial sector 515) of the wheel surface 500 are coated with a fluorescent phosphor to emit the fluoresced beam 340. Some versions of phosphor wheel surface 500 may have a portion or the entire area of two or more radial sectors coated with different fluorescent phosphors. Each emits a fluoresced beam (e.g., the beam 340) of a corresponding fluoresced spectrum when illuminated by the top-hat distributed excitation beam 325. (E.g., the radial sectors 515 or the portion 510 thereof are coated with a phosphor to emit green wavelengths, the radial sectors 520 or portions thereof are coated with a phosphor to emit yellow wavelengths, and the radial sectors 525 or portions thereof are coated with a phosphor to emit red wavelengths). Each coated surface portion (e.g., the surface portion 510) emits the fluoresced beam 340 corresponding to the fluoresced spectrum with a periodicity and for a period of time dependent upon an arc length and the angular velocity of the coated portion illuminated by the top-hat distributed excitation beam 325 while being illuminated by the beam 325.

Some embodiments of the shared-path illumination apparatus 300 include a condensing and collimation optical element group 350 optically coupled to the optical wavelength conversion element 330. The condensing and collimation optical element group 350 directs the fluoresced beam 340 back to the light pipe 320.

In some embodiments of the illumination apparatus 300, the light pipe 320 is formed in a tapered shape. In such case, the shape narrows toward the optical wavelength conversion element 330 in order to direct the top-hat spatially distributed excitation beam 325 to the optical wavelength conversion element 330 and to direct the fluoresced beam 340 back into the light pipe 320. A tapered shape light pipe embodiment of the illumination apparatus 300 may not include the condensing and collimation optical element group 350.

Some embodiments of the shared-path illumination apparatus 300 optically relay the homogenized fluoresced beam 358 to an output 375 via an image relay optics group 370 and the dichroic mirror 318 as shown. It is noted, however, that the optical path of the beam 358 from the light pipe 320 to the output 375 may be implemented with configurations of mirrors and optical elements other than the example relay elements shown in FIG. 3 for the example apparatus 300.

Some embodiments of the shared-path illumination apparatus 300 also include first and second optical condensers 380 and 385, respectively. The first optical condenser 380 is optically coupled to an excitation input end of the light pipe 320 to direct the excitation beam 313 to the excitation input end of the light pipe 320. The optical condenser 380 also enlarges the homogenized fluoresced beams 358 emerging from the light pipe 320. The second optical condenser 385 is optically coupled to a fluoresced beam input end of the light pipe 320 to direct the fluoresced beam 340 to the fluoresced beam input end of the light pipe 320.

FIG. 6 is a schematic diagram of a shared-path illumination apparatus 600 according to various example embodiments. The illumination apparatus 600 includes the excitation energy sources 310, the excitation beam 313, the light pipe 320, the top-hat distributed excitation beam 325, the optical wavelength conversion element 330, the emitting surface 335, the fluoresced beams of photons 340, the condensing and collimation optical element group 350, the image relay optics group 370, the output 375, and the first and second optical condensers 380 and 385, all as previously coupled together and described with reference to the shared-path illumination apparatus 300 of FIG. 3 with the following exceptions.

The shared-path illumination apparatus 600 is an example case of the excitation beams 313 entering the excitation light path directly without passing through portions of image relay optics. The excitation energy sources 310 (e.g., the sources 310A and 310B) of the apparatus 600 are located off of a longitudinal axis of the light pipe 320. The longitudinal axis is perpendicular to the emitting surface of the optical wavelength conversion element 330. In some embodiments of the apparatus 600, the excitation sources 310 may be positioned radially around the longitudinal axis of the light pipe 320. In the configuration of the apparatus 600, the excitation beams (e.g., the beams 313A and 313B) are not in the beam path of the homogenized fluoresced beam 358. Accordingly, the dichroic mirror 318 is not needed to separate the excitation beam wavelengths from the fluoresced beam wavelengths. Another consequence of the off-axis excitation source configuration and the lack of a dichroic is that the excitation spectrum is not limited to UV but may optionally be of another high-energy wavelength such as approximately 448 nm corresponding to blue light. In the latter case, it may be desirable to include blue light at the output 375. However, phosphors coated onto the emitting surface 335 of the wavelength conversion element 330 do not fluoresce at wavelengths corresponding to blue light.

Figures 7A, 7B, 7C:
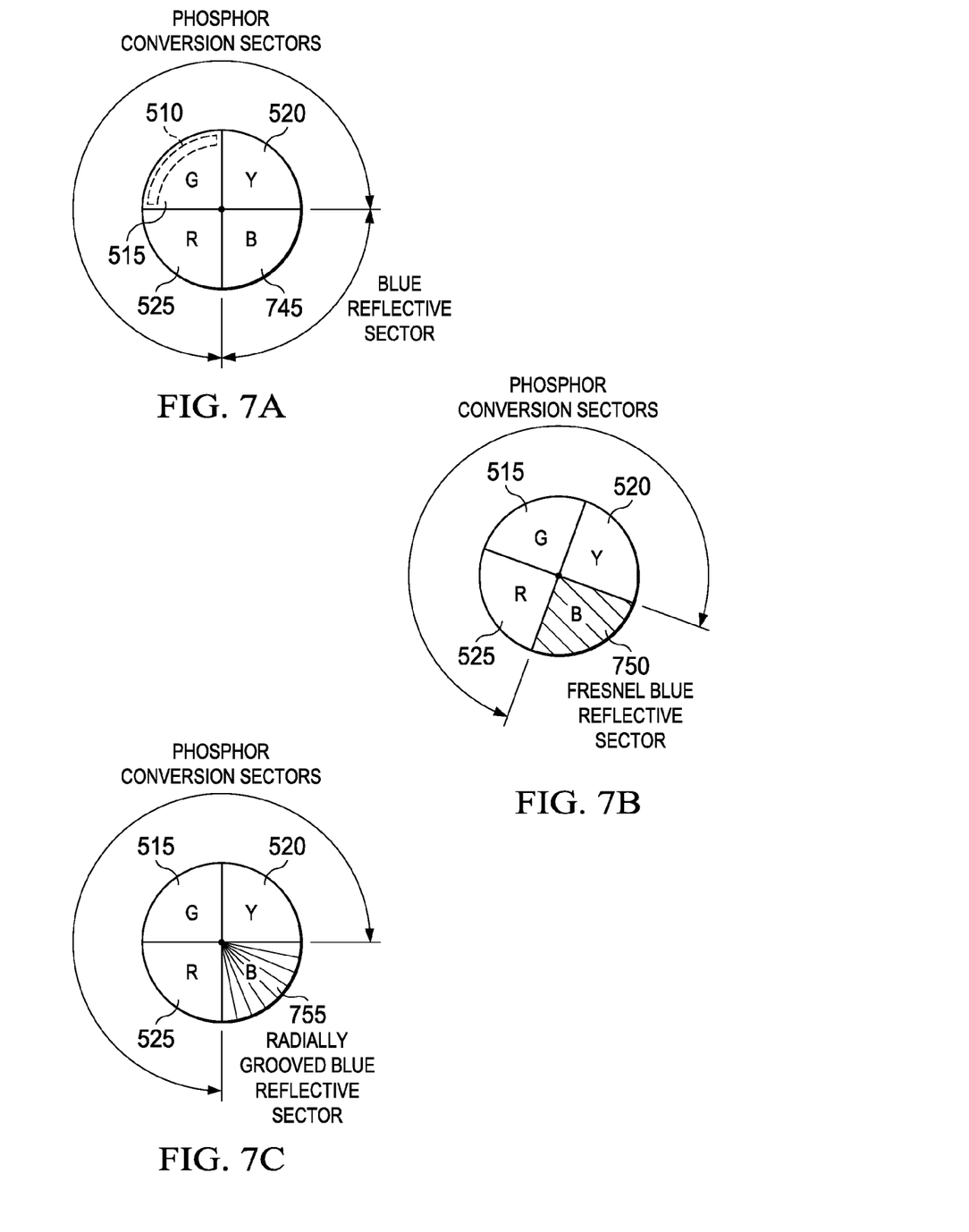
FIG. 7A is a diagram of a phosphor coated wheel surface according to various example embodiments.
FIG. 7B is a diagram of a phosphor coated wheel surface according to various example embodiments.
FIG. 7C is a diagram of a phosphor coated wheel surface according to various example embodiments.

FIGS. 7A, 7B and 7C are diagrams of phosphor coated wheel surfaces according to various example embodiments. The surface 335 of the wavelength conversion element 330 of the apparatus 600 also includes one or more areas reflective to light of the excitation spectrum (e.g., wavelengths corresponding to the output color blue in this example case). The reflective areas direct the top-hat distributed excitation beam 325 back to the light pipe 320. For example, the reflective areas may include one or more portions of one or more radial sectors (e.g., the radial sector 745 of FIG. 7A) of a phosphor wheel embodiment of the wavelength conversion element 330.

In some embodiments, the reflective area of the surface 335 may be coated with a reflective coating. The reflective area may also be fabricated with a set of microstructures to disperse the reflected portion of the excitation beam across a greater angle outward from the reflective surface than would be the angle of dispersion without the microstructures. Such microstructures may include a Fresnel grating 750 as shown in FIG. 7B or a set of radial grooves 755 as shown in FIG. 7C, for example.

Turning back to FIG. 6, some embodiments of the shared-path illumination apparatus 600 also include a mirror 675 and/or additional relay optics to direct the homogenized fluoresced or reflected beams to the output 375. In the case of non-UV excitation light sources, some embodiments of the apparatus 600 may also include a switchable Bragg grating 680 in the output beam path. The switchable Bragg grating 680 passes light of a color (e.g., blue) corresponding to the excitation spectrum during first predetermined time periods when the color is desired at the output. The switchable Bragg grating 680 blocks light corresponding to the excitation spectrum during second predetermined time periods when some other color is desired at the output 375. Doing so prevents unconverted excitation energy from passing into an output beam of a different color and corrupting the output beam of the non-excitation spectrum color during the second time periods.

Figure 8:
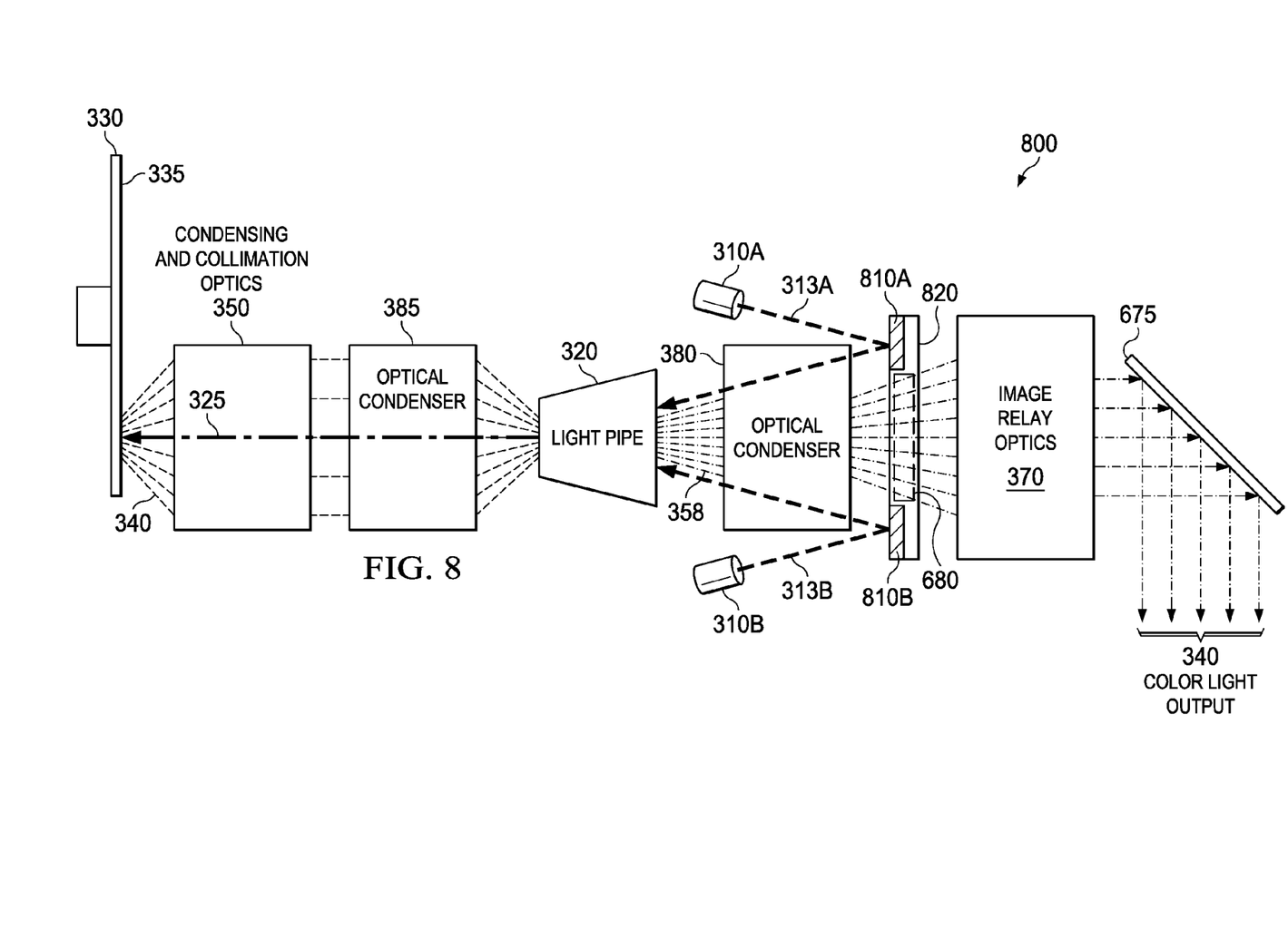
FIG. 8 is a schematic diagram of a shared-path illumination apparatus according to various example embodiments.

FIG. 8 is a schematic diagram of a shared-path illumination apparatus 800 according to various example embodiments. The apparatus 800 includes the excitation energy sources (e.g., the sources 310A and 310B), the excitation beams (e.g., the beams 313A and 313B), the light pipe 320, the top-hat distributed excitation beam 325, the optical wavelength conversion element 330, the emitting surface 335, the fluoresced beams of photons 340, the condensing and collimation optical element group 350, relay optics (e.g., the image relay optics group 370 and the mirror 675), the output 375, and the first and second optical condensers 380 and 385, all as previously coupled together and described with reference to the shared-path illumination apparatus 600 of FIG. 6.

The shared-path illumination apparatus 800 also includes one or more reflectors (e.g., the reflectors 810A and 810B) optically coupled to the light pipe 320. The reflectors direct the excitation beams (e.g., the beams 313A and 313B) from the excitation energy sources to the light pipe 320. The reflectors may be fabricated as a transmissive plate 820 with a reflective coating along a periphery of the plate 820 to reflect light of the excitation spectrum. By "folding" the excitation beams, the reflectors may enable a more compact location of the excitation energy sources. A transmissive portion of the transmissive plate 820 may be fabricated as a switchable Bragg grating 680 as previously described with reference to the illumination apparatus 600 of FIG. 6.

Figure 9:
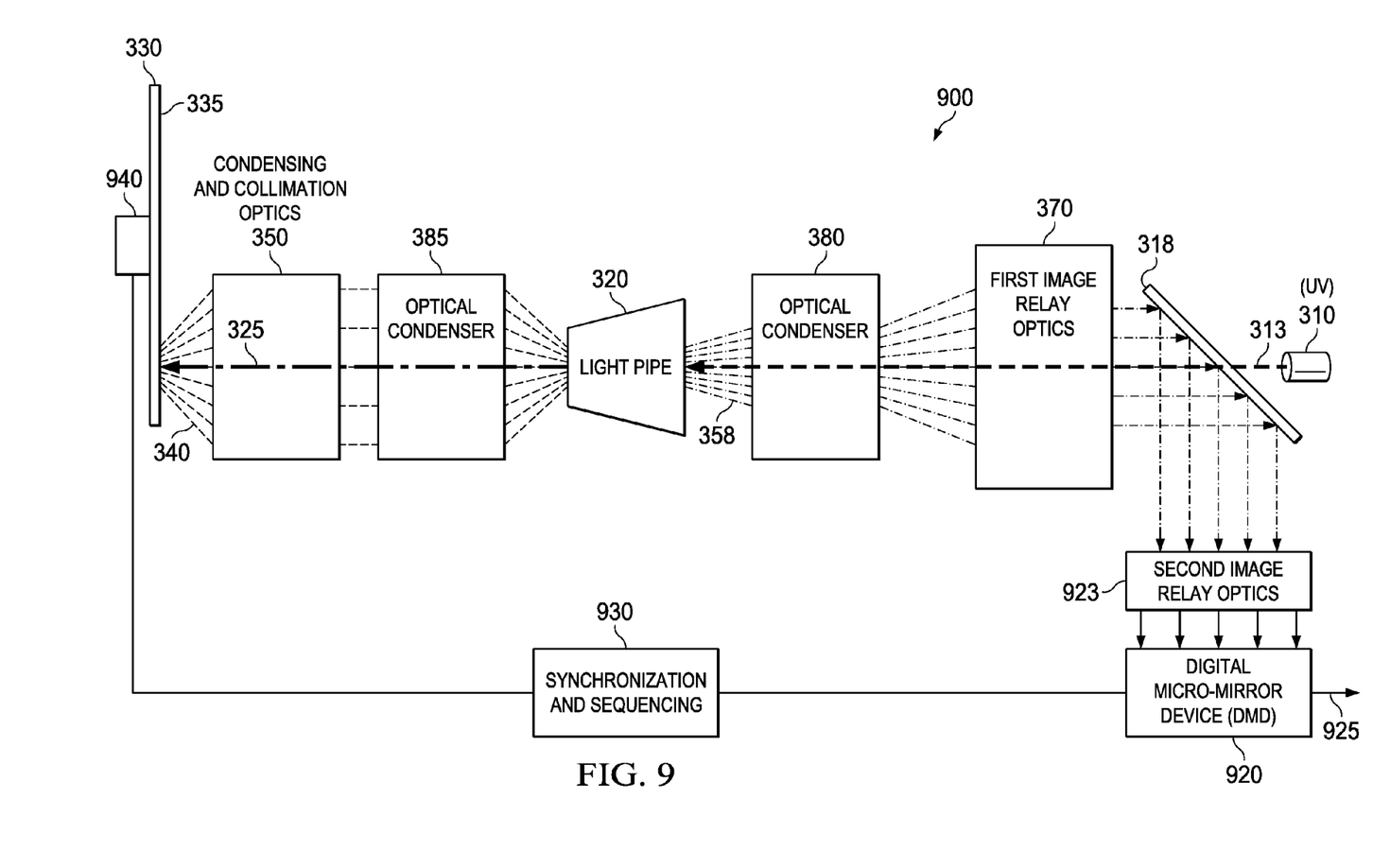
FIG. 9 is a schematic diagram of a shared-path illumination system according to various example embodiments.

FIG. 9 is a schematic diagram of a shared-path illumination system 900 according to various example embodiments. Some embodiments of the system 900 include the excitation energy sources 310, the excitation beam 313, the light pipe 320, the top-hat distributed excitation beam 325, the optical wavelength conversion element 330, the emitting surface 335, the fluoresced beams of photons 340, the condensing and collimation optical element group 350, the output 375, and the first and second optical condensers 380 and 385, all as previously coupled together and described with reference to the shared-path illumination apparatus 300 of FIG. 3.

Some embodiments of the system 900 may be fabricated with the excitation energy sources 310 located off-axis relative to the light pipe 320 and include components as previously described relative to the apparatus 600 and 800 of FIGS. 6 and 8, respectively.

Some embodiments of the illumination system 900 include a tapered version of the light pipe 320. The tapered light pipe 320 re-distributes power across an area of the Gaussian excitation beam 313 corresponding to a width of the excitation beam 313. Such re-distribution of power results in order a substantially top-hat distributed excitation beam 325. The tapered light pipe 320 also homogenizes the fluoresced beam 340 from the optical wavelength conversion element 330 to form a homogenized fluoresced beam 358. A widened end of the tapered light pipe 320 is optically coupled to the excitation energy source 310 to receive the Gaussian excitation beam 313. A narrowed end of the tapered light pipe 320 is optically coupled to the optical wavelength conversion element 330 to direct the top-hat spatially distributed excitation beam 325 to the optical wavelength conversion element 330. A tapered shape light pipe embodiment of the illumination system 900 may not include the condensing and collimation optical element group 350.

The image generation system 900 further includes a DMD 920 optically coupled to the light pipe 320. The DMD 920 includes a two-dimensional set of micro mirrors to receive the homogenized fluoresced or reflected beam 358 and to create a pixel image primary color frame. The DMD 920 creates the pixel image by directing a portion of the homogenized fluoresced or reflected beam 358 corresponding to each mirror into or away from a pixel image output path 925. Directing a mirrored portion of the beam into the pixel image output path 925 generates a bright pixel of a color corresponding to the fluoresced spectrum. Directing a mirrored portion of the beam away from the pixel image output path 925 generates a dark pixel.

The image generation system 900 also includes one or more image relay optics groups and/or components (e.g., a first image relay optics group 370, the dichroic mirror 318 and a second image relay optics group 923). The image relay optics groups and/or components are optically coupled to the light pipe 320 and to the DMD 920 to transfer the homogenized fluoresced beam 358 to the DMD 920.

The image generation system 900 also includes a synchronization and sequencing circuit 930 communicatively coupled to the wavelength conversion element 330 and to the DMD 920. The synchronization and sequencing circuit 930 synchronizes the periodicity and on time of each homogenized fluoresced beam 358 of a given spectrum with a state of the mirrors of the DMD 920 during the on time. The synchronization and sequencing circuit 930 sequences multiple homogenized fluoresced beams 358 to the DMD 920, each of a narrow band spectrum. Each homogenized fluoresced beam 358 may (but need not) include wavelengths in a spectrum corresponding to a primary color.

Synchronization and sequencing may be accomplished at the wavelength conversion element 330 by controlling a motor 940 used to move or rotate the conversion element 330, and/or sensing position information associated with a current position of one or more portions of the surface 335 of the conversion element 330. Synchronization and sequencing may also be accomplished wholly or in part by controlling the direction, the on time and/or the power of each of the excitation beams, either together or differentially.

The overall effect as perceived in an integrated form by the human eye is a time-multiplexed color pixel image. The color pixel image may be full-color as appropriate for television or movie projection, for example. However, some embodiments of the image generation system 900 may produce images of only a few colors as may be appropriate for signage, heads-up display projection and other such applications.

Apparatus and systems described herein may be useful in applications other than generating sequences of homogenized light beams of various colors from a low etendue, narrow band excitation source for image projection. The examples of the apparatus 300, 600 and 800 and the system 900 described herein are intended to provide a general understanding of the structures of various embodiments and the sequences of various methods. They are not intended to serve as complete descriptions of all elements and features of systems and methods that might make use of these example structures and sequences.

Structures herein generate sequenced output beams of homogenized colored light, one color at a time, generated from one or more low etendue, narrow band excitation light sources. A Gaussian-distributed excitation light beam from the excitation light source enters a light pipe and is there converted to a top-hat distributed excitation beam. The top-hat distributed excitation beam is focused on a phosphor-coated or reflective portion of the surface of an optical wavelength conversion element. The phosphor coated areas emit fluoresced beams of wavelengths corresponding to the phosphor type and to wavelengths associated with the excitation spectrum. Reflective areas reflect light from the top-hat distributed excitation beam. Fluoresced and reflected beams travel outward from the wavelength conversion element and re-enter the light pipe to be homogenized by the light pipe during transit through the light pipe. The homogenized fluoresced or reflected beam is relayed to the output as one of a sequence of colors of homogenized light generated from the low etendue, narrow band excitation source (s). The invented structures thus perform both Gaussian to top-hat conversion of the excitation beams directed toward the optical conversion element and homogenization of beams directed outward from the optical conversion element using a single, shared light pipe. Doing so may provide better-distributed light output while saving component cost and decreasing the size of low etendue, narrow band excitation illumination apparatus and systems.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An illumination apparatus, comprising:
   at least one electromagnetic excitation energy source to emit an excitation beam of a substantially Gaussian spatial distribution ("Gaussian excitation beam") to include wavelengths in an excitation spectrum;
   an optical wavelength conversion element optically coupled to the electromagnetic excitation energy source, a portion of an emitting surface of the wavelength conversion element coated with at least one of a fluorescent phosphor or a reflective surface, the fluorescent phosphor to receive a top-hat spatially distributed excitation beam and to generate at least one fluoresced beam of photons of at least one fluoresced spectrum, the reflective surface to reflect the top-hat spatially distributed excitation beam, the fluoresced beam or the reflected beam to be generated with a predetermined periodicity during at least one predetermined period of time;
   a light pipe optically coupled to the excitation energy source to receive the Gaussian excitation beam, to re-distribute power across an area of the Gaussian excitation beam corresponding to a width of the Gaussian excitation beam in order to form a substantially top-hat spatially distributed excitation beam, the light pipe optically coupled to the wavelength conversion element to homogenize the fluoresced beam or the reflected Gaussian excitation beam; and a condensing and collimation optical element group optically coupled to the optical wavelength conversion element to direct the top-hat spatially distributed excitation beam to the wavelength conversion element and to direct the fluoresced beam or the reflected Gaussian excitation beam back to the light pipe.

2. The illumination apparatus of claim 1, the light pipe formed in a tapered shape, the shape narrowing toward the optical wavelength conversion element to direct the top-hat spatially distributed excitation beam to the optical wavelength conversion element and to direct the fluoresced beam back into the light pipe.

3. The illumination apparatus of claim 1, the optical wavelength conversion element being a wheel capable of spinning, the emitting surface being a flat surface of the wheel, at least a portion of at least one of a plurality of radial sectors of the wheel surface coated with the fluorescent phosphor to emit the fluoresced beam of photons, the predetermined periodicity determined by an angular velocity of the phosphor-coated portion and the predetermined period of time determined by the arc length of the phosphor coated portion while illuminated by the top-hat distributed excitation beam.

4. The illumination apparatus of claim 3, at least one portion of at least one radial sector being a reflective surface to reflect the top-hat distributed excitation beam back to the light pipe.

5. The illumination apparatus of claim 4, the reflective portion of the radial sector fabricated with a set of microstructures selected from a group consisting of a Fresnel grating and a set of radial grooves, the set of microstructures to disperse the reflected top-hat spatially distributed excitation beam across a greater angle outward from the surface of the wheel than would be the angle of dispersion without the microstructures.

6. The illumination apparatus of claim 1, the excitation spectrum including wavelengths associated with ultraviolet ("UV") light.

7. The illumination apparatus of claim 6, further including:
a dichroic mirror optically coupled to the light pipe to pass a beam of light of the UV excitation spectrum to the light pipe and to reflect the homogenized fluoresced beam received from the light pipe to an output.

8. The illumination apparatus of claim 1, the excitation energy source being an array of excitation energy sources positioned around a longitudinal axis of the light pipe, the longitudinal axis perpendicular to the emitting surface of the optical wavelength conversion element.

9. The illumination apparatus of claim 8, the excitation spectrum corresponding to a color selected from a group consisting of blue and ultraviolet ("UV") light.

10. The illumination apparatus of claim 8, further including:
a switchable Bragg grating to pass light corresponding to the excitation spectrum during first predetermined time periods and to block light corresponding to the excitation spectrum during second predetermined time periods in order to prevent unconverted excitation energy from passing into an output beam during the second predetermined time periods.

11. The illumination apparatus of claim 8, further comprising:
at least one reflector optically coupled to the light pipe to direct the excitation beam from the excitation energy source to the light pipe.

12. The illumination apparatus of claim 11, the reflector being a transmissive plate with a reflective coating along a periphery of the plate.

13. The illumination apparatus of claim 12, a transmissive portion of the transmissive plate being a switchable Bragg grating to pass light corresponding to the excitation spectrum during first predetermined time periods and to block light corresponding to the excitation spectrum during second predetermined time periods in order to prevent unconverted excitation energy from passing into an output beam during the second predetermined time periods.

14. The illumination apparatus of claim 8, further including:
an image relay optics group optically coupled to the light pipe to direct the homogenized fluoresced beam to an output.

15. The illumination apparatus of claim 1, further including:
a first optical condenser optically coupled to an excitation input end of the light pipe to direct the excitation beam to the excitation input end of the light pipe; and
a second optical condenser optically coupled to a fluoresced beam input end of the light pipe to direct the fluoresced beam to the fluoresced beam input end of the light pipe.

16. An illumination apparatus, comprising:
at least one electromagnetic excitation energy source to emit an excitation beam of a substantially Gaussian spatial distribution ("Gaussian excitation beam") to include wavelengths in an excitation spectrum;
an optical wavelength conversion element optically coupled to the electromagnetic excitation energy source, at least one portion of an emitting surface of the wavelength conversion element coated with a fluorescent phosphor to receive a substantially top-hat distributed excitation beam and to generate at least one of a fluoresced beam of photons of a fluoresced spectrum or a reflected top-hat spatially distributed excitation beam with a predetermined periodicity during at least one predetermined period of time; and
a tapered light pipe, a wide end of the tapered light pipe optically coupled to the excitation energy source to receive the Gaussian excitation beam and to re-distribute power across an area of the Gaussian excitation beam corresponding to a width of the Gaussian excitation beam in order to form the substantially top-hat distributed excitation beam and a narrow end of the tapered light source optically coupled to the wavelength conversion element to homogenize the fluoresced beam or the reflected Gaussian excitation beam to form at least one of a homogenized fluoresced beam or a homogenized reflected Gaussian excitation beam.

17. An image generation system, comprising:
at least one electromagnetic excitation energy source to emit an excitation beam of a substantially Gaussian distribution ("Gaussian excitation beam") to include wavelengths in an excitation spectrum;
an optical wavelength conversion element optically coupled to the electromagnetic excitation energy source, a portion of an emitting surface of the wavelength conversion element coated with at least one of a fluorescent phosphor or a reflective surface, the fluorescent phosphor to receive a top-hat spatially distributed excitation beam and to generate at least one fluoresced beam of photons of at least one fluoresced spectrum, the reflective surface to reflect the top-hat spatially distributed excitation beam, the fluoresced beam or the reflected beam to be generated with a predetermined periodicity during at least one predetermined period of time;

a light pipe optically coupled to the excitation energy source to receive the Gaussian excitation beam, to re-distribute power across an area of the Gaussian excitation beam corresponding to a width of the Gaussian excitation beam in order to form a substantially top-hat spatially distributed excitation beam, the light pipe optically coupled to the wavelength conversion element to homogenize the fluoresced beam or the reflected Gaussian excitation beam;

a condensing and collimation optical element group optically coupled to the optical wavelength conversion element to direct the top-hat spatially distributed excitation beam to the wavelength conversion element and to direct the fluoresced beam or the reflected Gaussian excitation beam back to the light pipe;

a digital micro-mirror device ("DMD") optically coupled to the light pipe, the DMD to include a two-dimensional set of micro mirrors to receive the homogenized fluoresced beam and to create a pixel image primary color frame by directing a portion of the homogenized fluoresced beam corresponding to each mirror into an image output path to generate a bright pixel of a color corresponding to the fluoresced spectrum or away from the image output path to generate a dark pixel; and a synchronization and sequencing circuit communicatively coupled to the wavelength conversion element and to the DMD to synchronize the periodicity and on time of each fluoresced beam of a given wavelength with a state of the DMD during the on time and to sequence multiple fluoresced beams of wavelengths corresponding to each primary color to the DMD to generate a time-multiplexed full color pixel image.

18. The image generation system of claim 17, further comprising:
a first optical condenser optically coupled to an excitation input end of the light pipe to direct the excitation beam to the excitation input end of the light pipe; and
a second optical condenser optically coupled to a fluoresced beam input end of the light pipe to direct the fluoresced beam or the reflected top-hat spatially distributed excitation beam to the fluoresced beam input end of the light pipe.

19. The image generation system of claim 17, further comprising:
at least one image relay optical element group optically coupled to the light pipe and to the DMD to transfer the homogenized fluoresced beam to the DMD.

* * * * *